United States Patent
Bradley et al.

[15] 3,657,956
[45] Apr. 25, 1972

[54] BLIND FASTENER

[72] Inventors: William David Bradley, Welwyn Garden City; Frederick Arthur Summerlin, Harpenden, both of England

[73] Assignee: Aerpat A.G., Zug, Switzerland

[22] Filed: Mar. 18, 1970

[21] Appl. No.: 20,631

[52] U.S. Cl. ............................................85/72, 85/61, 85/74
[51] Int. Cl. ..................................................F16b 31/02
[58] Field of Search..................85/72, 73, 74, 75, 77, 78, 85/4, 61; 151/2, 2 A, 8, 14.5, 15, 16, 21 C, 23, 30

[56] References Cited

UNITED STATES PATENTS

| | | | |
|---|---|---|---|
| 959,162 | 5/1910 | Perrie | 151/15 |
| 1,185,772 | 6/1916 | Collier | 151/14.5 |
| 1,467,824 | 9/1923 | Ahlers | 85/4 |
| 1,720,799 | 7/1929 | McLaughlin | 151/14.5 |
| 2,298,203 | 10/1942 | Eklund | 85/74 |
| 3,078,002 | 2/1963 | Rodgers | 85/73 |
| 3,129,630 | 4/1964 | Wiwg et al. | 85/75 |
| 3,222,977 | 12/1965 | Vaughn | 85/73 |
| 3,230,818 | 1/1966 | Siebol | 85/72 |
| 3,459,447 | 8/1969 | Hurd et al. | 151/30 |

FOREIGN PATENTS OR APPLICATIONS

| | | | |
|---|---|---|---|
| 438,766 | 3/1912 | France | 151/16 |
| 153,897 | 7/1932 | Switzerland | 151/15 |

*Primary Examiner*—Marion Parsons, Jr.
*Attorney*—Kemon, Palmer & Estabrook

[57] ABSTRACT

A blind fastener comprises a bolt having an externally threaded shank, a head at one end of the shank, a pair of opposed flat wrenching surfaces at the other end of the shank, an annular breaker groove in the shank intermediate the head and the wrenching surfaces, and four swaging grooves in the shank intermediate the said breaker groove and the bolt head. A tubular nut is in threaded engagement with the shank of the bolt, the nut having an enlarged hexagonal head at the end thereof remote from the head of the bolt. The fastener also comprises an expandable tubular member on the shank of the bolt between the head of the bolt and the nut. A locking ring is positioned around the bolt shank at a position thereon on the side of the nut head remote from the bolt head, the locking member being swageable, after the nut and bolt have been screwed towards each other thereby to expand the expandable member to form a blind head, into at least one of the swaging grooves in the shank, thereby to lock the nut and bolt together.

5 Claims, 9 Drawing Figures

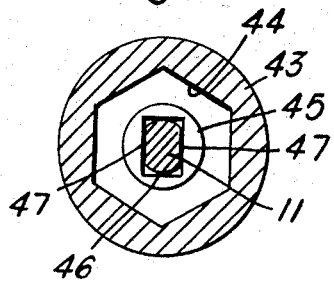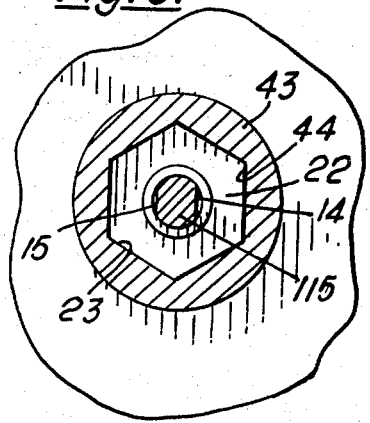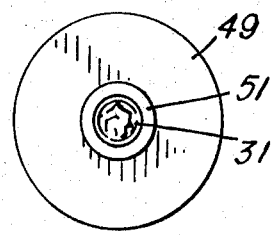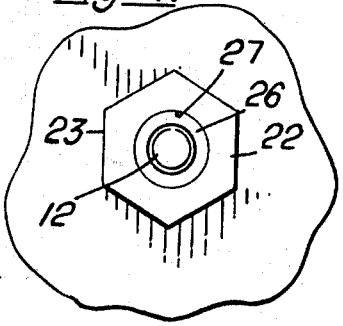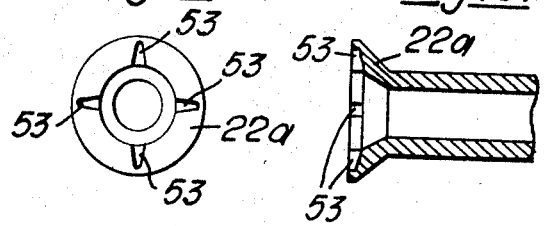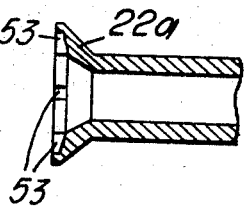

3,657,956

BLIND FASTENER

The invention relates to blind fasteners.

The term "blind fastener" is well understood to mean a fastener which in use requires access to one side only of two adjacent work pieces to be fastened together thereby.

The invention provides, in one of its aspects, a blind fastener comprising:

a bolt having an externally threaded shank, a head at one end of the shank, wrenching surfaces at the other end of the shank, at least one annular breaker groove in the shank intermediate the head and the wrenching surfaces, and at least one swaging groove in the shank intermediate the said breaker groove and the bolt head;

a nut in threaded engagement with the shank of the bolt, the nut having an enlarged head at the end thereof remote from the head of the bolt, the head being provided with wrenching surfaces, the other end of the nut being towards the head of the bolt;

an expandable member of the shank of the bolt between the head of the bolt and the aforesaid other end of the nut;

and a locking member positioned around the bolt shank at a position thereon on the side of the nut head remote from the bolt head, the said locking member being swageable, after the nut and bolt have been screwed towards each other thereby to expand the expandable member to form a blind head, into the or at least one of the swaging grooves in the shank thereby to lock the nut and bolt together.

Conveniently the locking member may be annular in form, and it may be in threaded engagement with the shank of the bolt. Thus it may be advanced along the shank by relative rotation between itself and the bolt.

The nut head is preferably provided with a recess in which the locking member is accommodated when swaged as aforesaid. The recess may be provided with a face inclined toward the bolt shank, thereby to assist in swaging the locking member into the swaging groove or grooves. That face of the locking member which is towards the recess may be similarly inclined, thereby to further assist in the swaging. When the annular locking member is in threaded engagement with the shank as aforesaid, preferably the arrangement is such that relative rotation of the locking member and shank drives the locking member into the recess so that the two inclined faces cooperate to force at least part of the locking member radially inwardly to effect swaging.

The arrangement is preferably such that when, after swaging of the locking member into one or more of the swaging grooves on the bolt shank is completed, the, or one of the, breaker grooves is adjacent that face of the locking member which faces away from the nut head, so that the application of sufficient tension to the said other end of the shank causes the shank to break at the said breaker groove.

The swaging groove or grooves may be annular, or longitudinal, in form, or of other convenient form. When the or each swaging groove is annular in form, a plurality of annular grooves may be provided such that at least one of them may provide either a breaker groove, or a swaging groove, depending upon the axial relationship of the bolt and nut.

The shank of the bolt may be formed, at the aforesaid other end thereof, with an extension connected to the shank by a weakened portion which has a lesser strength than the shank has at any of the aforesaid annular grooves intermediate the head and the wrenching surfaces, the extension also having wrenching surfaces. The wrenching surfaces on the shank and the extension may be continuous with each other across the weakened portion.

A specific embodiment of the invention, together with a modification thereof, will now be described by way of example and with reference to the accompanying drawings, in which:

FIGS. 4, 5, 6 and 7 are sections taken respectively on the lines IV — IV and V — V of FIG. 1 and VI — VI and VII — VII of FIG. 3; and FIG. 8 is an end elevation of, and FIG. 9 is a longitudinal section through, the head portion of the nut of a modified form of fastener.

Figure 1:
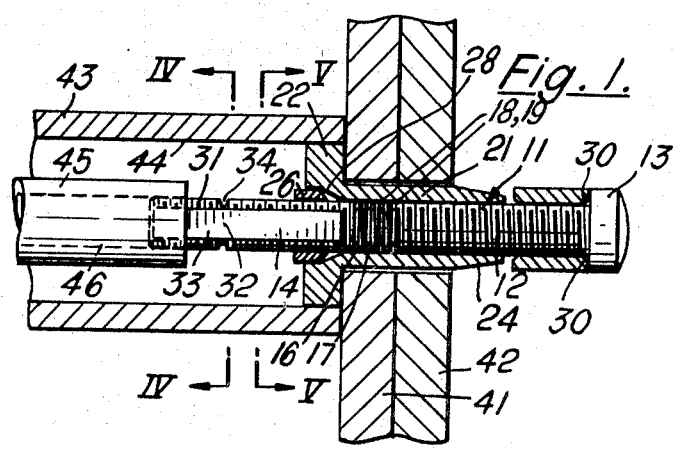
FIGS. 1, 2 and 3 are longitudinal sections through a blind fastener, showing successive configurations of the fastener when being used to secure together two sheets.

The blind fastener illustrated in FIGS. 1 to 7 comprises a bolt 11 having an externally threaded shank 12 and a head 13 at one end of the shank, a pair of opposed parallel flat wrenching surfaces 14 and 15 at the other end of the shank, and four annular grooves 16, 17, 18 and 19 in the shank intermediate the head 13 and the wrenching surfaces 14, 15. The spacing between the centres of adjacent grooves is approximately twice the pitch of the thread on the bolt. The grooves are nearer to the wrenching surfaces than to the bolt head. The fastener further comprises a nut 21 in threaded engagement with the shank of the bolt, the nut having an enlarged hexagon head 22 at the end thereof remote from the head 13 of the bolt, the head having six wrenching surfaces 23 provided by the sides of the hexagon head. The other end of the nut which is towards the head 13 of the bolt is externally tapered at 24. The fastener also comprises an expandable member in the form of a cylindrical sleeve 25 on the shank of the bolt between the head thereof 13 and the tapered end 24 of the nut. The inside of each end of the sleeve is bevelled at 30. The fastener also comprises a locking member in the form of an annular collar 26 in threaded engagement with the shank 14 and positioned on the side of the nut 21 remote from the bolt head 13. The nut head 22 is provided with a counterbore recess 27 which can receive the locking collar 26. The recess 27 is provided with an inner tapered or frusto-conical face 28 which is inclined inwardly toward the bolt shank. The end face of the locking collar 26 which faces towards the recess also has a frusto-conical tapered end face 29. The taper on the face 28 of the recess 27 forms a smaller angle with the bolt axis than does the taper on the face 29 of the locking collar 6.

The bolt 11 of this example is also formed with an extension 31 at the end thereof remote from the head 13. The extension is connected to the shank by means of a weakened portion 32 which has a lesser strength that has the shank at any of the four annular grooves 16, 17, 18 and 19. The extension 31 also has two opposed parallel flat wrenching surfaces 33, the wrenching surfaces on the shank and extension being continuous with each other across the weakened portion. The extension 31 is initially formed as part of the bolt shank, the weakened portion 32 being thereafter produced by cutting away two opposed V-shaped portions of the bolt shank.

Figure 2:
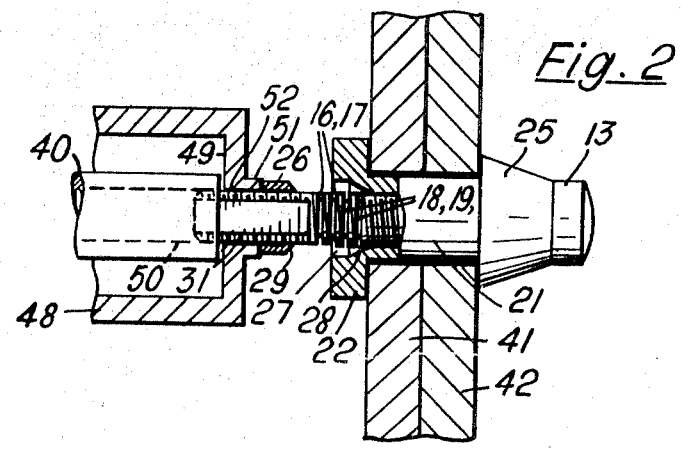
Figure 3:
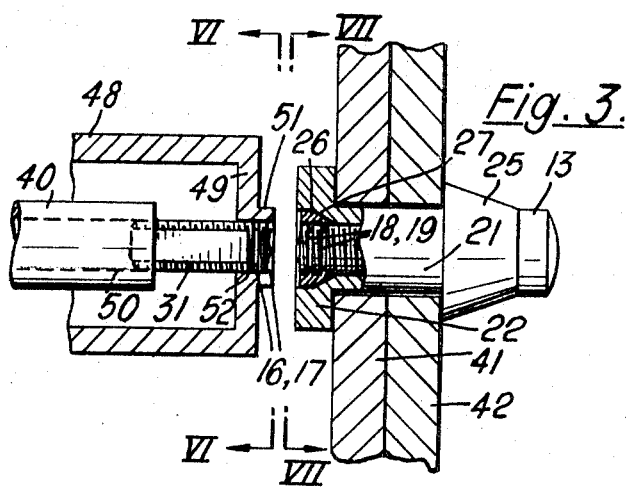

In this example, the fastener is used to fasten together two superposed metal sheets 41, 42 through which has been drilled a cylindrical hole 43 in which the cylindrical exterior of the shank of the nut 21 is a clearance fit. It will be noted that the distance along the parallel part of the exterior of the nut between the head 22 and the start of the tapered face 24 is chosen to be substantially equal to the combined thickness of the sheets 41, 42 to be fastened. In order to set this fastener, two different tools are used successively on the fastener. One example of a suitable first tool is indicated in FIGS. 1, 4 and 5, and comprises a stationary outer tube 43 formed at its end with a hexagonal socket 44 which fits the hexagon head 22 on the fastener bolt. Inside the tube 43 and co-axial with it is a rotatable drive shaft 45 having formed in its end a socket 46 to receive the extension 31 on the end of the fastener bolt, the socket having opposed flat surfaces 47 which engage the wrenching surfaces 33 on the extension. The tool is provided with a suitable motor (e.g. electric or pneumatic) and gearing to rotate the driver shaft 45 in an anti-clockwise direction (when looking along the drive shaft towards the free end of the tube 43). One example of a suitable second tool is indicated in FIGS. 2, 3 and 6. This tool comprises an inner socketed shaft 40 which has in its end a socket 50 similar to that of the shaft 45 in the first tool. However the shaft 40 of the second tool remains stationary (i.e. non-rotating). Co-axial with and outside the shaft 40 is a rotatable tube 48 having an end wall 49 enclosing the shaft 40. Co-axially in the centre of the end wall 49 is a projecting annular anvil 51 surrounding an internally threaded aperture 52, this thread mating with that on the fastener bolt 12. This tool is also provided with a suitable motor and gearing, for rotating the tube 48 and anvil 51 in a clockwise direction (when looking out of the tube 48 through the threaded aperture 52) with respect to the stationary inner shaft 40.

In use, the fastener is inserted through the drilled hole 43 in the sheets so that its head 22 abuts the rear face of the sheet 41, the tapered surface 24 of the nut, the expandable sleeve 25 and the bolt head 13 all projecting on the blind side of the sheets (i.e. the side of the further sheet 42 remote form the head 22). The first tool is applied to the fastener as illustrated in FIG. 1, with the hexagon socket 44 engaging the hexagon head 22 of the nut to prevent rotation of the nut, and the socket 46 of the driver shaft 45 receiving the free end portion of the bolt extension 31 and engaging the wrenching flats 33 thereon. This position is illustrated on FIG. 1. The tool is then actuated to rotate the driver shaft 45 anti-clockwise with respect to the stationary tube 43. Since the nut is held stationary and the thread on the bolt 11 is right-handed, the bolt is screwed into the nut so that the extension 31 on the bolt tail advances into the driver socket 46, and the bolt head 13 approaches the tapered end surface 24 of the nut. The expandable sleeve 25 is driven over the tapered surface 34 and is thereby expanded, forming a blind head on the fastener. The bolt continues to be thus screwed into the nut until the expanded end of the sleeve 25 meets the face of the sheet 42, when the sleeve 25 prevents the head 13 of the bolt approaching nearer to the nut, thus preventing further rotation of the bolt. The continued torque applied to the extension 31 by the driver shaft 45 then causes the weakened portion 32 between the extension and the bolt to break, after which the first tool is switched off and removed from the fastener. It should be noted that the end of the driver shaft 45 must be sufficiently far inside the end of the stationary tube 43 of the tool that the weakened portion 32 of the fastener bolt remains outside the driver socket 46 when the bolt is thus screwed completely into the nut.

The second tool is now applied to the partially set fastener, in the way illustrated in FIG. 2. The threaded aperture 52 in the end of the outer tube is offered up to the broken end of the fastener bolt shank 12 and the tool motor actuated, so that the threaded aperture 52 screws itself on to the bolt. The annular anvil 51 meets the locking collar 26, and, driving it by frictional contact, screws along the bolt shank towards the recess 27 in the nut head. The socket in the end of the shaft 47 (which is not rotating) fits over the end of the bolt shank, the tool being bodily rotated if necessary so that the end of the bolt is properly aligned to enter the rectangular socket in the shaft 47, so that the wrenching surfaces on the bolt are engaged by the complementary surfaces in the socket. The rotating anvil 21 continues to screw the locking collar 27 along the bolt, until the outer circumference of the tapered face 29 on the collar meets the outer circumference 28 of the recess 27. Contact between the collar 26 and the wall of the recess in the nut head resists rotation of the collar, so that slip occurs between the annular anvil 51 and the collar. Since the annular anvil 51 continues to be rotated and simultaneously advanced along the bolt by virtue of its threaded engagement with the bolt, the locking collar 26, whether it rotates to a greater or lesser extent or not at all, is forced into the recess, and at least the part of it b ounded by its tapered surface 29 is forced radially inwardly by the tapered surface 28 of the recess so that its material is swaged into at least one of the annular grooves in the bolt shank. In the particular example illustrated in FIG. 3, the locking collar is swaged into two of the grooves (18 and 19) which thus provide swaging grooves. The third groove 17 is adjacent the rear face of the locking collar and, in this particular example, is about one thread inside the threaded aperture 52 in the tool, the fourth groove 16 being further inside the aperture. The stationary shaft 40 with its socket engaging the wrenching surfaces 33 on the end of the bolt prevents rotation of the bolt whilst the locking collar 26 is being swaged into position and rotated.

When the collar 26 is fully deformed in the recess 27 and fully swaged into the grooves on the bolt shank, it prevents further advance of the annular anvil along the bolt. Consequently the part 49 of the tool, by virtue of the engagement of the threads of aperture 52, exerts a considerable tension on the part of the bolt shank with which it is engaged, and the bolt shank breaks at the annular groove which is nearest to the contact interface between the annular anvil and the locking collar. As mentioned above, in this particular example it is the annular groove 17 which is in this position, so that this groove provides the breaker groove.

It will be seen that the collar 26 has been swaged securely into a number of grooves in the bolt shank, and that the bolt shank is broken off at a position which is substantially flush with the end of the nut head 22.

The locking collar would satisfactorily fulfil its locking function even if it were swaged into only one of the annular grooves in the bolt shank. It will be seen that the provision of a number of such grooves spaced apart along the bolt shank provides for a range of axial relationships between the bolt and the nut in which the locking collar will thus work successfully, provide always of course that there is at least one annular groove adjacent the outer face of the locking collar when in the swaged position at which the bolt shank can break off. This range of axial relationships means that the fastener would operate in different sheet thickness within a certain range. The second and third annular grooves 17 and 18 could each provide either a breaker groove or alternatively a swaging groove, depending upon the aforementioned axial relationship between the bolt and the nut.

FIGS. 8 and 9 illustrate a modification of the fastener of the above described example. In this modification, the nut, instead of having a hexagon head, has a countersunk head 22a. The wrenching surfaces in the nut are provided by four grooves 53 in cruciform lay-out, somewhat similar to the arrangement used in the well-known cross-head screws. The first of the two tools used for placing the fastener will obviously have suitable complementary wrenching surfaces provided on the outer end of its stationary outer tube.

The fasteners of the foregoing examples may be made of steel. For example, the nut and bolt may be made of steel of about 75 to 85 tons/square inch ultimate tensile strength (UTS), and the sleeve and collar may be made of steel of about 43 to 48 tons/square inch UTS. The parts may be made of alloy steel and subsequently cadmium plated. Alternatively all the parts may be made of stainless steel, only the sleeve being cadmium plated.

The invention is not limited to the details of the foregoing example and modification thereof. For instance, the locking member need not be in threaded engagement with the bolt. The weakened portion 32 of the bolt shank need not be provided (i.e. the shank extends for the full length, there being no separate "extension"), provided that the first placing tool is provided with a torque slip clutch in the drive to the inner socket.

The bolt shank may have, in addition to the plurality of annular grooves, one or more longitudinal grooves extending along approximately that part of the shank where the annular grooves are located. For example, there may be two annular grooves, intersecting with two longitudinal grooves spaced apart equally around the bolt shank.

The threaded aperture 52 of the second tool may have its outer end part counterbored, thereby to assist in the bolt shank breaking at a breaker groove located just inside the outer end of the aperture.

Other various parts of the fastener may be made of other suitable materials.

Other suitable forms of placing tools may be used to place the fastener. In order to assist in making the bolt shank break substantially flush with the nut head, additional measures may be employed. For example, the tool may be pulled sideways after completion of swaging of the locking collar.

We claim

1. A blind fastener comprising:- a bolt having an externally threaded shank, a head at one end of the shank, a weakened portion at the other end of the shank, said shank adapted to break under torsion at said weakened portions, and a shank extension connected to the shank through the weakened portion;

a nut in threaded engagement with the shank of the bolt, the nut having an enlarged head at the end thereof remote from the head of the bolt, the other end of the nut being towards the head of the bolt, the enlarged head of the nut being provided with wrenching surfaces:

an expandable member on the shank of the bolt between the head of the bolt and the said other end of the nut and adapted to expand over said other end of said nut, said shank being adapted to break under torsion at said weakened portion after expansion of said expandable member and a swageable locking member positioned around the shank of the bolt, the nut being disposed between the head of the bolt and the locking member, wherein the shank of the bolt has at least one breaker groove intermediate between said weakened portion and said head of the bolt whereby said shank is adapted to break under tension at said breaker groove when said locking member is set, and at least one swaging groove between the breaker groove and the head of the bolt, and wrenching surfaces between the breaker groove and the said weakened portion, and the shank extension also has wrenching surfaces, the bolt having a lesser strength at said weakened portion than at any other part thereof.

2. A blind fastener as claimed in claim 1, in which the locking member is in threaded engagement with the shank of the bolt, so that it may be advanced along the shank by relative rotation between itself and the bolt.

3. A blind fastener as claimed in claim 1, in which the nut head is provided with a recess in which the locking member is accommodated when swaged as aforesaid.

4. A blind fastener as claimed in claim 1, in which the recess is provided with a face inclined towards the bolt shank, thereby to assist in swaging the locking member into the swaging groove or grooves.

5. A blind fastener as claimed in claim 4, in which that face of the locking member which is towards the recess is similarly inclined, thereby to further assist in the swaging.

* * * * *

UNITED STATES PATENT OFFICE
CERTIFICATE OF CORRECTION

Patent No. 3,657,956          Dated April 25, 1972

Inventor(s) William David Bradley and Frederick Arthur Summerlin

It is certified that error appears in the above-identified patent and that said Letters Patent are hereby corrected as shown below:

[30] Foreign Application Priority Data (not shown)

should be:

[30] Foreign Application Priority Data

March 28, 1969    Great Britain    16462/69

IN THE CLAIMS:

Claim 1, Column 5, line 4, "portions" should be --portion--;

Claim 4, Column 6, line 1, "1" should be --3--.

IN THE SPECIFICATION:

Column 1, line 36, "toward" should be --towards--;

Column 2, line 34, "6" should be --26--;

, line 38, "that" should be --than--;

Column 3, line 10, "form" should be --from--;

Column 4, line 7, "the" (first occurrence) should be --that--;

Column 4, line 23, "provide" should be --provided--;

Column 4, line 67, "Other" should be --The--.

Signed and sealed this 5th day of December 1972.

(SEAL)
Attest:

EDWARD M. FLETCHER, JR.
Attesting Officer

ROBERT GOTTSCHALK
Commissioner of Patents